Dec. 17, 1968   R. B. PFEIFER ET AL   3,416,467
DEVICE FOR FORMING A PIE OR TART SHELL
Filed Sept. 14, 1966
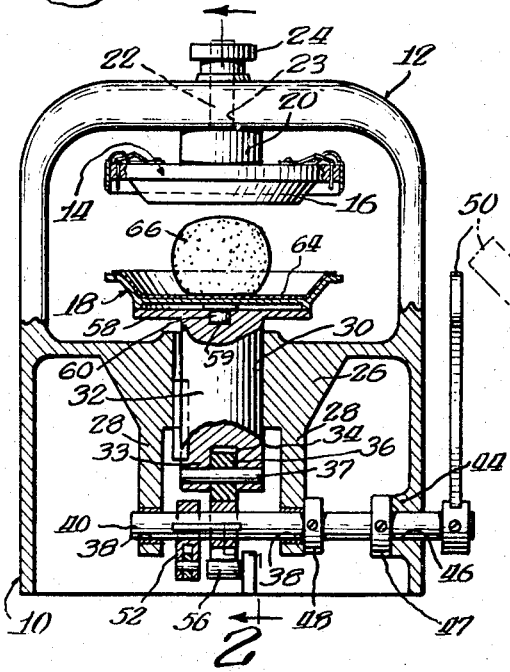
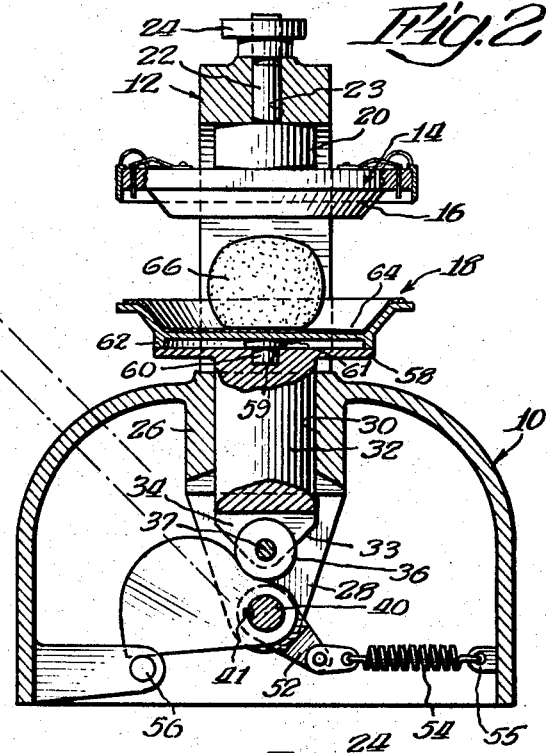
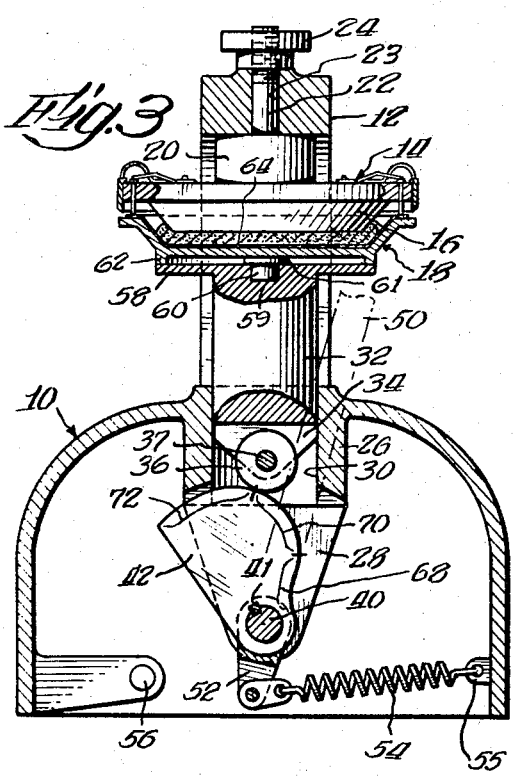
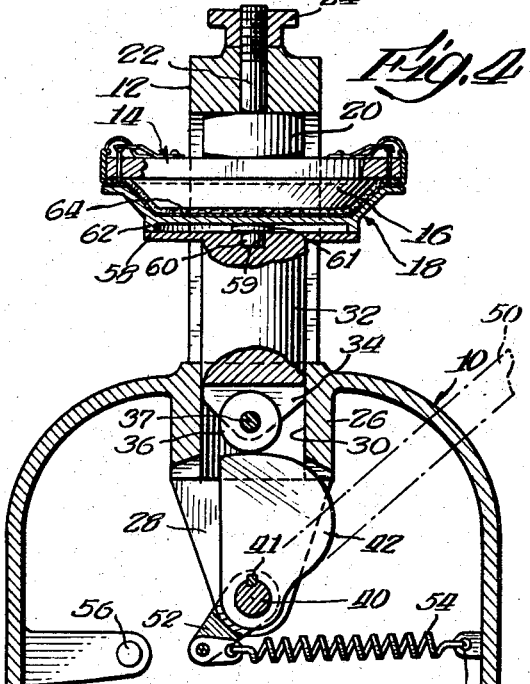
Inventors:
Raymond B. Pfeifer
and Charles J. Kopp
BY MAX R. KRAUS ATTY.

ns position, as shown in FIG. 4. The pie or tart shell
United States Patent Office 3,416,467
Patented Dec. 17, 1968

3,416,467
DEVICE FOR FORMING A PIE OR TART SHELL
Raymond B. Pfeifer, Chicago Heights, and Charles J. Kopp, Chicago, Ill., assignors to Original Equipment Manufacturers, Inc., a corporation of Illinois
Filed Sept. 14, 1966, Ser. No. 579,406
2 Claims. (Cl. 107—15)

ABSTRACT OF THE DISCLOSURE

A device for forming a pie or tart shell comprising an upper mold member and a lower reciprocable mold member, with the lower reciprocable member being operated by means of a cam member having a first lobe portion, an intermediate lobe portion and an uppermost lobe portion.

---

This invention relates to a device for forming a pie or tart shell.

One of the objects of this invention is to provide a device for forming or molding the dough so that it forms a shell for a pie or tart or the like.

Another object of this invention is to provide a device for forming a pie or tart shell which utilizes a stationary upper mold member and a reciprocable lower mold member which produces shells of uniform shape and precise thickness.

The present invention, in one embodiment, embraces a device comprising a stationary upper mold member and a reciprocable lower mold member, with the lower mold member moving from its initial lowermost position through a rapid first phase of movement and then through a slower final phase of movement. This is accomplished with a minimum of manual effort and produces a perfectly formed tart or pie shell.

Another object of this invention is to utilize a cam member and operate same either manually or through electrical means for operating the reciprocable mold member.

Other objects will become apparent as this description progresses.

In the drawings:

FIG. 1 is a side view partly in section showing the device forming this invention with the parts in their initial position.

FIG. 2 is a sectional view taken on line 2—2 of FIG. 1.

FIG. 3 is a view similar to FIG. 2 but showing the movement of the operating parts through the first phase of movement, and FIG. 4 is a view similar to FIG. 2 but showing the movement of the parts through the second or final phase of movement.

The device comprises a hollow base or housing, generally indicated at 10, of a generally dome-shaped configuration. Extending upwardly of the base and either formed integrally therewith or suitably fastened thereto is an inverted U-shaped support member, generally indicated at 12, which supports the stationary upper mold member, generally indicated at 14. The upper mold member 14 has a bottom 16 whose outer surface is shaped to the configuration of the inner surface of the lower mold member, generally indicated at 18, so that the upper mold member 14 rests within the lower mold member 18. The upper mold member 14 is provided with a heating element and with other details of construction (not shown) well-known in the art, which forms no part of this invention. The upper mold member 14 also has conventional stripper pins which engage the pan, to be described, in the lower mold member.

The upper mold member has a neck portion 20 and an externally threaded stem 22. The stem 22 extends through a central opening 23 in the support member 12. A thumbscrew 24 is secured to the threaded stem 22 to anchor the mold member 14 to the support member 12. The upper mold member 14 is thus removably secured to the support member 12 for cleaning purposes and the like.

The base 10 has a centrally positioned body portion, generally indicated at 26, provided with a pair of spaced parallel extending legs 28. The body portion 26 is provided with a vertically extending bore 30 which receives a reciprocable cylindrical-shaped member, generally indicated at 32. The lower end of the reciprocable member 32 has tapering sides 33 and has a central slot 34 to accommodate a follower or wheel 36 which is rotatably supported on a pin 37 extending transversely through suitable openings in the bottom of the reciprocable member 32.

The spaced legs 28 are provided with alined openings 38 to receive a shaft 40 to which is fixedly secured, as at 41, the cam member, generally indicated at 42. The cam member 42 is in engagement with the follower or wheel 36 of the reciprocable member 32. The shaft 40 is also supported in a boss 44 formed in the base 10 and the shaft extends through a transverse opening 46 in the boss exteriorly of the base. Collars 47 and 48 fixedly secured to the shaft prevent lateral shifting of the shaft. A handle 50 is fixedly secured to the shaft 40 for the purpose of manually rotating the shaft.

An arm 52 is fixed to the shaft 40. A coil spring 54 is attached to the arm 52 with the opposite end suitably attached to the base as at 55. The spring 54 serves to return the shaft 40 to its initial position, shown in FIGS. 1 and 2, after the handle 50 has been manually operated to rotate the shaft 40 and then released. The reciprocable member 32 will descend when the shaft 40 is rotated to its initial position. A stop member 56 secured to the base 10 engages the cam member 42 to limit the return rotation of the shaft 40, as best shown in FIG. 2.

The lower mold member 18 is secured to the reciprocable member 32. The upper end of the reciprocable member 32 has a horizontally positioned disc or plate 58 which is provided with a central recess 59. The lower mold member 18 has a centrally positioned downwardly extending stud or pin 60 provided with a shoulder 61. The pin 60 extends into the recess 59 with the shoulder 61 serving to space the bottom of the mold member 18 from the reciprocable member 32. The bottom of the mold member 18 has an annular flange 62 which rests on the disc 58 of the reciprocable member 32. The pin 60 is in frictional engagement with the reciprocable member 32 for positive securement of the lower mold member to the reciprocable member. The lower mold member 18 is therefore detachably secured to the reciprocable member 32.

A metal foil pan 64 is positioned in the lower mold member 18. A measured quantity of dough 66 is placed in the pan 64 and the dough is pressed to form the pie or tart shell when the lower mold member 18 is moved to its up position, as shown in FIG. 4. The pie or tart shell remains in the pan and the pie is baked in the pan, which remains with the pie or tart until same reaches the consumer.

The cam member 42 is so shaped that it has a lowermost lobe portion 68, an intermediate lobe portion 70 and an uppermost lobe portion 72. With the cam member in the position shown in FIGS. 1 and 2, the reciprocable member 32 will be at its lowermost position and at this stage the follower or wheel 36 is in engagement with the lowermost lobe portion 68 of the cam member. As the handle 50 rotates the shaft 40 and moves the cam from the FIG. 2 to the FIG. 3 position, the wheel 36 will move over the intermediate lobe portion 70 of the cam member, which provides for a rapid upper movement of the reciprocable member 32 and with it the lower mold member 18. Continued rotation of the shaft 40 and cam member 42 will cause the wheel 36 to move over the uppermost lobe portion 72 of the cam member from the FIG. 3 to the FIG. 4 position, which completes the upward movement of the reciprocable member and lower mold member 18.

Movement of the cam member from the FIG. 2 to the FIG. 3 position will produce a rapid upward movement of the reciprocable member 32 with a minimum of manual effort on the part of the operator. This will cause the dough 66 to assume the shape and thickness shown in FIG. 3 as it moves against the upper stationary mold 14. Movement of the cam member through the last phase of movement from FIG. 3 to FIG. 4 will complete the shaping and reduce the thickness of the dough to that shown in FIG. 4.

While this invention has been described as a manually operated device, it will be understood that the shaft 40 and cam member 42 thereon may be electrically operated, that is, the shaft 40 may be rotated by an electrical motor through suitable reduction gears.

It will be understood that various changes and modifications may be made from the foregoing without departing from the spirit and scope of the appended claims.

What is claimed is:
1. A device for forming a pie or tart shell comprising, a base and an inverted U-shaped supporting member extending upwardly of the base, an upper mold member stationarily secured to the inverted U-shaped supporting member, a reciprocable member supported by said base, a lower mold member supported on said reciprocable member and reciprocable therewith, means for reciprocating said reciprocable member, said means including a cam member operating said reciprocable member, said cam member having a first lobe portion, an intermediate lobe portion and an uppermost lobe portion wherein when the intermediate lobe portion of the cam is in operative engagement with the reciprocable member the reciprocable member is caused to move rapidly upward and when in engagement with the uppermost lobe portion is caused to move upward less rapidly, and spring means for returning the cam member to its initial position and retracting the reciprocable member and lower mold member.

2. A device as defined in claim 1 which has stop means engaged by the cam member to limit the return of the cam member.

References Cited

UNITED STATES PATENTS

| | | | |
|---|---|---|---|
| 2,122,316 | 6/1938 | Ganio. | |
| 2,123,230 | 7/1938 | Clark et al. | 107—1 |
| 2,127,651 | 8/1938 | Panther | 107—15 |
| 2,174,550 | 10/1939 | Chapman | 100—214 XR |
| 2,927,620 | 3/1960 | Elliott | 100—292 XR |

FOREIGN PATENTS

| | | |
|---|---|---|
| 839,742 | 6/1960 | Great Britain. |

WALTER A. SCHEEL, *Primary Examiner.*

A. O. HENDERSON, *Assistant Examiner.*